United States Patent
Lozada

(10) Patent No.: US 12,329,606 B2
(45) Date of Patent: *Jun. 17, 2025

(54) INTER DENTAL IMPLANT

(71) Applicant: Italo Lozada, Weston, FL (US)

(72) Inventor: Italo Lozada, Weston, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/459,684

(22) Filed: Sep. 1, 2023

(65) Prior Publication Data
US 2023/0404718 A1 Dec. 21, 2023

Related U.S. Application Data

(63) Continuation of application No. 17/146,877, filed on Jan. 12, 2021, now Pat. No. 11,766,315.

(51) Int. Cl.
A61C 8/00 (2006.01)

(52) U.S. Cl.
CPC .......... *A61C 8/0054* (2013.01); *A61C 8/0048* (2013.01); *A61C 8/0068* (2013.01); *A61C 8/0069* (2013.01); *A61C 8/0074* (2013.01)

(58) Field of Classification Search
CPC .............................. A61C 8/005; A61C 8/0063
See application file for complete search history.

(56) References Cited

U.S. PATENT DOCUMENTS

| 4,756,686 | A | * | 7/1988 | Spolsino | F23D 14/465 |
| | | | | | 431/345 |
| 4,988,299 | A | * | 1/1991 | Branemark | A61C 8/0022 |
| | | | | | 433/174 |
| 5,116,225 | A | * | 5/1992 | Riera | A61C 8/006 |
| | | | | | 433/173 |
| 5,873,721 | A | * | 2/1999 | Willoughby | A61C 8/0048 |
| | | | | | 433/172 |
| 2003/0165796 | A1 | * | 9/2003 | Carmichael | A61C 8/0022 |
| | | | | | 433/174 |
| 2003/0224328 | A1 | * | 12/2003 | Sapian | A61C 8/0086 |
| | | | | | 433/173 |
| 2005/0277090 | A1 | * | 12/2005 | Anderson | A61C 8/0022 |
| | | | | | 433/173 |
| 2006/0014120 | A1 | | 1/2006 | Sapian | |
| 2006/0141419 | A1 | * | 6/2006 | Heo | A61C 8/0069 |
| | | | | | 433/201.1 |
| 2012/0295223 | A1 | | 11/2012 | Robb | |
| 2015/0004563 | A1 | | 1/2015 | Blaisdell | |
| 2016/0074141 | A1 | * | 3/2016 | Lozada | A61C 8/008 |
| | | | | | 433/174 |

FOREIGN PATENT DOCUMENTS

| JP | 2007513680 A | * | 5/2007 | ............. A61L 27/56 |
| TW | 1228983 B | | 3/2005 | |
| WO | WO-9414388 A1 | * | 7/1994 | ......... A61C 13/0003 |

* cited by examiner

*Primary Examiner* — Heidi M Eide
(74) *Attorney, Agent, or Firm* — Lambert Shortell & Connaughton; David J. Connaughton, Jr.; Justin P. Tinger

(57) ABSTRACT

A multi-piece dental prosthesis system is provided. The system includes an implant which can be implanted into a bone of the patient, an abutment removably connected to the implant by a prosthetic screw, and a ti-base removably connected to the abutment. The system may be used to hold a crown, denture, or partial denture in place.

19 Claims, 7 Drawing Sheets

INTER DENTAL IMPLANT

BACKGROUND OF THE INVENTION

Field of the Invention

The present invention relates generally to inner dental implant systems. Specifically, the present invention relates to a multi-piece dental prosthesis system.

Description of Related Art

Generally, the installation of a dental prosthesis replicating a tooth is performed in two steps. The first step is the installation of a bone screw ("implant") into a bone of a patient. This involves drilling a hole, and then setting a screw. This screw must then set for a period of time to allow the patient's body to adapt and accept the screw, and allow new bone growth in and around the screw. Only after this time period has elapsed can a replica tooth prosthesis (commonly called a "crown") be installed by connecting it to this now secure screw. Usually this connection is via an adhesive. This process requires a substantial amount of a dentist's time, leading to higher costs. Further, the waiting period after the screw is implanted is uncomfortable and difficult for the patient. Further still, the bone target for screw installation, which will be drilled, is often not uniform, and is difficult to estimate. As such, the drilling may easily be off, causing a misaligned screw, or worse.

Unguided drilling creates a number of additional difficulties such as maintaining proper drill orientation throughout the entire drilling process. Failure to maintain proper orientation through the entire drill cycle can cause unwanted widening of the drilled hole as well as a non-straight and non-uniform hole. Improper orientation can also cause damage to the adjacent anatomical structures such as perforation of the sinus cavity, puncture or close placement of the implant to the nerve canal, unwanted proximity to the roots of adjacent teeth, perforation of the buccal or lingual alveolar plate of the area in question, among others issues.

Therefore, what is needed is a dental prosthesis that may be installed at the same time as the installation of the screw, and that may also aid in guiding proper placement of the drilled hole and screw therein.

SUMMARY OF THE INVENTION

The subject matter of this application may involve, in some cases, interrelated products, alternative solutions to a particular problem, and/or a plurality of different uses of a single system or article.

In one aspect, a multi-piece dental prosthesis is provided. The prosthesis comprises an implant operable to be implanted into a bone of a patient. An abutment is removably engaged with the implant via a prosthetic screw. The prosthetic screw is engaged with both the implant and the abutment. The prosthetic screw is removable from the abutment by being unscrewed and passing through a central opening of the abutment which extends all the way through from a front to rear of the abutment. The abutment defines threads on an outer portion at a rear of the abutment. A ti-base defines a central opening through its height. The ti-base has threads extending into this central opening which are sized to engage with the threads on the exterior of the abutment.

DETAILED DESCRIPTION

Figure 1:
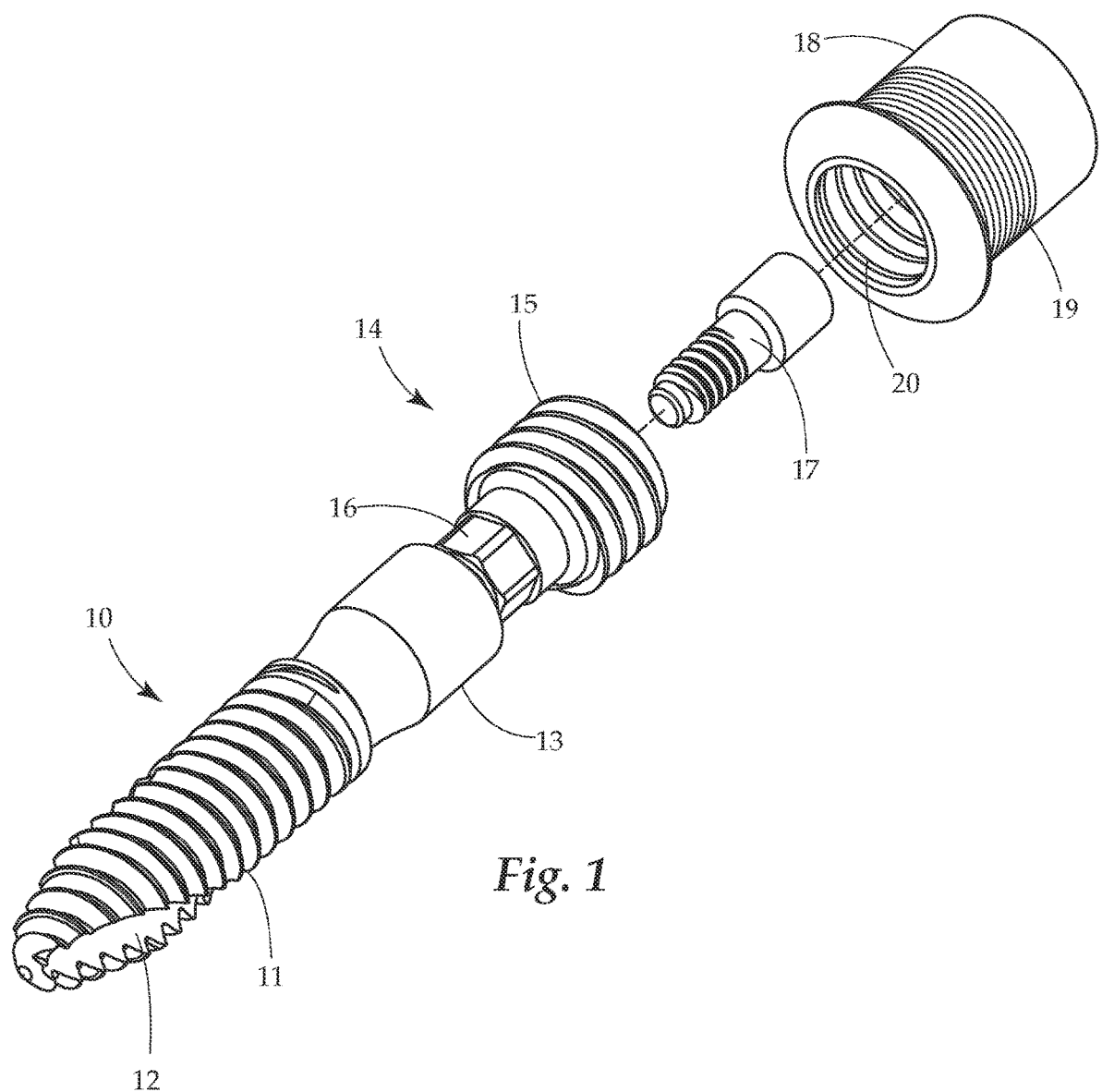
FIG. 1 provides an exploded view of an embodiment of the dental implant system disclosed herein.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a dental prosthesis which may, in many embodiments, be installed concurrently with an implant (bone screw) to support and anchor the crown/denture/partial denture. The dental prosthesis system disclosed herein, in some embodiments also takes advantage of a crown mounted to a ti-base which defines a passageway through it, this passageway is operable to guide the placement of the implant by directing and limiting movement from an intended path of placement into the patient. The passageway may guide a drill bit when pre-drilling, or may guide the implant itself when the implant is self-drilling. The dental prosthesis is formed of multiple parts, such that components can be removed in the event that the crown breaks, is damaged, or otherwise requires replacement. These multiple parts allow the crown to be removed while leaving the implant in place permanently attached to the bone.

As is known in the art, a dental implant preferably may be given a period of time to be accepted by the patient's body before it can fully support the dental prostheses (often referred to as a crown). This is because the patient's body takes time to accept the implanted screw, and grow bone around it to hold it securely in place.

In embodiments wherein a tooth is being extracted and will soon after be replaced with a prosthesis, a 3D model may be taken of the tooth, and then replicated such that the replacement tooth is a nearly identical replica of the original removed tooth. For example a 3D scan of a removed tooth of the patient may be taken using a computerized system. Based on this scan, the prosthesis may be generated automatically using a computer controlled system based on the scanned removed tooth. In embodiments wherein the tooth has been removed and the original tooth is not available, a best guess may be made to replicate the original tooth based on measurements of the installation area.

In one embodiment, a method of identifying the best area for bone drilling may include taking a 3D X-ray of the jaw or bone around the tooth. This will provide a 3D model of the bone structure around the area to be drilled, and will allow the operator to identify the path the implant will take. However, it should be understood that any method to identify the best path for the implant may be used.

In most embodiments, the multi-piece dental implant system comprises an implant which is intended to be implanted into the bone of a patient. An abutment is removably connectable to the implant. In one embodiment, the abutment is removably connectable to the implant via a prosthetic screw. A ti-base is connectable to the abutment and defines a central opening through which the prosthetic screw may pass. A crown, partial denture, or full denture can then be attached to the ti-base (or multiple ti-bases and implant systems). Accordingly, if the crown/denture/partial denture is to be replaced, the prosthetic screw can be accessed by drilling through the crown, and removing the screw. The abutment, ti-base attached thereto, and crown/denture/partial denture can then be removed, leaving the implant in place.

In one embodiment, which may be interchangeable with any of the disclosed embodiments herein, the ti-base may be omitted and the crown, denture, or partial denture may have threads formed into its own material, such that an opening extending from the top to bottom in the crown/denture/partial denture includes these threads. This allows omission of the ti-base, which typically carries the threads on the inner surface of an opening through its length. Currently, there is a challenge of forming the dental prostheses having threads on their internal surface, but as this technology develops, it is likely that these threads can be effectively formed thereon. Such an embodiment, with the prosthesis including the threads for attachment to the abutment is thus contemplated herein, and can be used in any of the different embodiments disclosed herein.

The implant may be any material capable of being screwed into bone and set therein. Generally, the implant may be made of typical medical or dental implant material such as zirconium, titanium, or the like. However, it should be understood that this invention is not limited to these materials. The implant contemplated herein may be any shaft, threaded or otherwise, capable of being implanted securely into a bone of a patient. The implant may be configured to set into a pre-drilled hole, may be self-drilling (also called "self-driven"), or self-tapping, among other options.

The drill contemplated herein may be any drill capable of drilling into bone tissue. Any existing dental or medical drill may be used, as well as future innovations on such drilling devices. In embodiments when the implant is self-drilling, the drill or other screwdriver may engage with a head of any one of the implant, the abutment which is engaged with the implant, or the prosthetic screw which is engaged with both the abutment and implant, and holding the abutment to the implant.

Turning now to FIG. 1, an exploded view of an embodiment of the dental implant system disclosed herein. An implant 13 is formed operable to be implanted into a bone of a patient. The implant 13 has screw threads 11 to secure it in place, and also has a self-drilling bit 12 shaped partially like a drill bit which, in this embodiment allows the implant to be placed without pre-drilling a hole. In other embodiments, pre-drilling may be performed with a traditional threaded implant without straying from the scope of this invention.

An abutment 14 fits into the implant. In this embodiment, the abutment 14 has a hexagonal cross section at its front 16 which engages with a corresponding shape (not shown in FIG. 1) on an inside of the implant 13. This allows for proper alignment of the abutment 14 relative to the implant 13, and also prevents axial motion of the abutment 14 relative to the implant 13. Any other shape or configuration may be used at the front portion of the abutment 14 to engage with the implant without straying from this invention. In other embodiments, a circular front portion of the abutment 14 may be used. In this embodiment, the abutment further comprises threads 15 on an exterior. These threads allow for connection with the ti-base 18. In the embodiment shown, the abutment 14 has a largest cross-sectional area which is slightly larger than the largest cross-sectional area of the implant, but this is not necessarily required in all embodiments.

A prosthetic screw 17 passes through an opening of the abutment 14 and can screw into the implant 13, such that a head of the prosthetic screw 17 engages with a shoulder or other surface on an inside of the abutment (not shown in FIG. 1). The screw 17 operates to hold the abutment 14 to the implant 13.

The ti-base 18 is formed having an outer surface with ridges 19 which help bind the crown/denture/partial denture to the ti-base 18. The ti-base 18 has an annular flange at its bottom, which supports the crown/denture/partial denture which is to be positioned against the flange and around the exterior off the ti-base 18. The ti-base 18 forms an inner opening having threads 20 on the inside. These threads 20 are shaped to engage with threads 15 of the abutment 14.

The multiple pieces of this embodiment allow the crown, partial denture, or full denture (not shown) which would be attached to the ti-base 18 to be removed, while keeping the implant permanently fixed into the bone of the patient. This removal can be performed by drilling an opening into the crown/denture/partial denture attached to the ti-base 18 to access the opening of the ti-base. A screw-driver may then be passed through this hole to access and engage with the prosthetic screw 17. The screw 17 can be removed, which will allow the abutment 14 to separate from the implant 13. At this point, the ti-base 18 is threadedly attached to the abutment 14, so the abutment 14 and ti-base 18 can be removed, in many cases, simultaneously.

Figure 2:
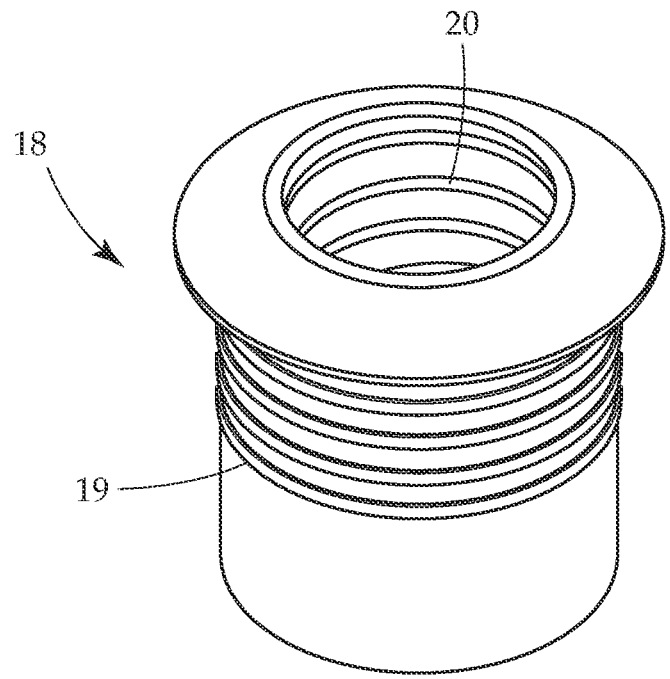
FIG. 2 provides a view of an embodiment of a crown base of the dental implant system disclosed herein.

FIG. 2 provides another perspective view of an embodiment the ti-base 18. As can be seen, the ti-base 18 has an approximately circular cross section with an annular flange extending from one side. The flange will abut the gums of the patient and is opposite to where the crown (or other prosthetic) will be attached to the ti-base. Ridges 19 extend on the outer side to help anchor the crown/denture/partial denture. Threads 20 are formed to engage with the abutment.

Figure 3A:
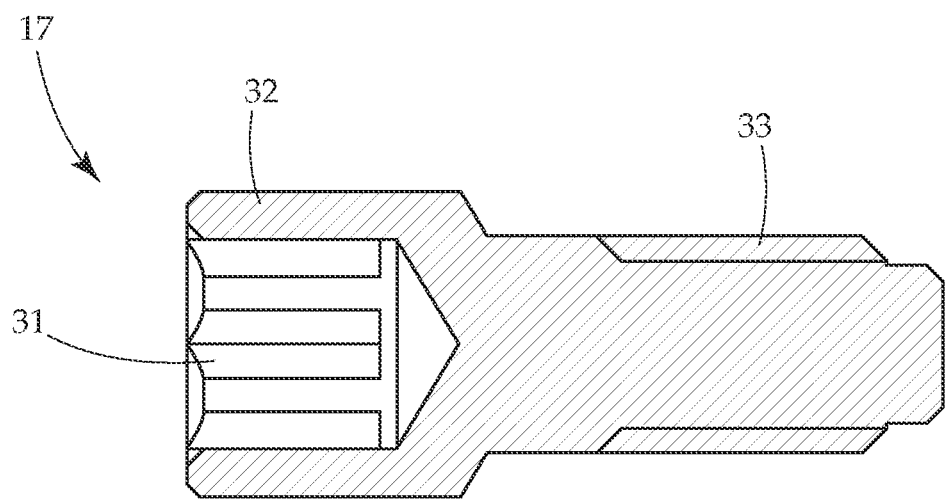
FIG. 3A provides a side cutaway view of an embodiment of a prosthetic screw of the dental implant system disclosed herein.
Figure 3B:
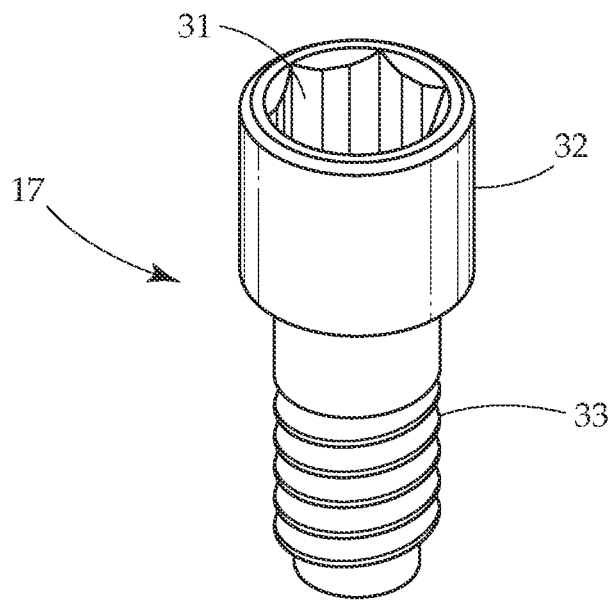
FIG. 3B provides a perspective view of an embodiment of a prosthetic screw of the dental implant system disclosed herein.

FIGS. 3A and 3B show views of an embodiment of the prosthetic screw 17. The screw has threads 33 and a head 32. A hex shape 31 is defined on an inner opening of the head 32, but of course any shape may be used without straying from the scope of this invention. The head 32 has a cross-sectional area which is greater than that of the threads 33, forming a ridge at the interface of the two. This interface may engage with part of the abutment 14 to hold it to the implant when the threads 33 engage with the implant 13.

Figure 4A:
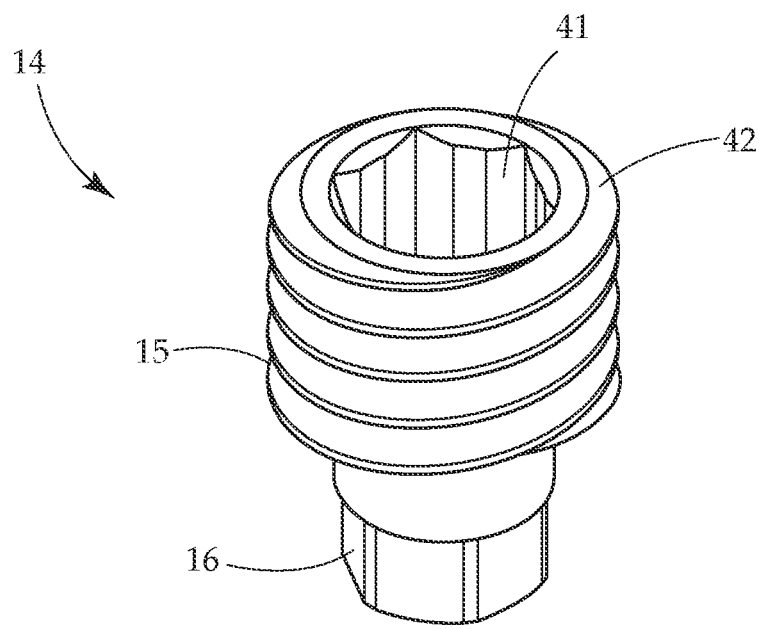
FIG. 4A provides a perspective view of an embodiment of an abutment of the dental implant system disclosed herein.
Figure 4B:
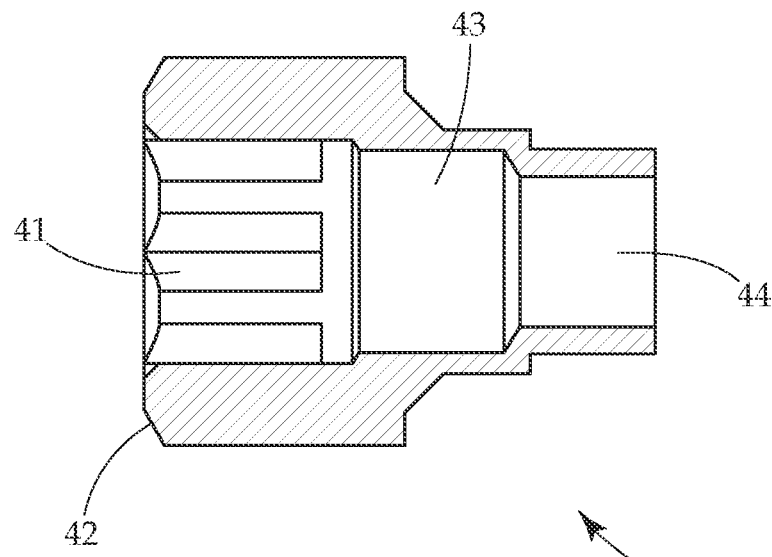
FIG. 4B provides a side cutaway view of an embodiment of an abutment of the dental implant system disclosed herein.
Figure 4C:
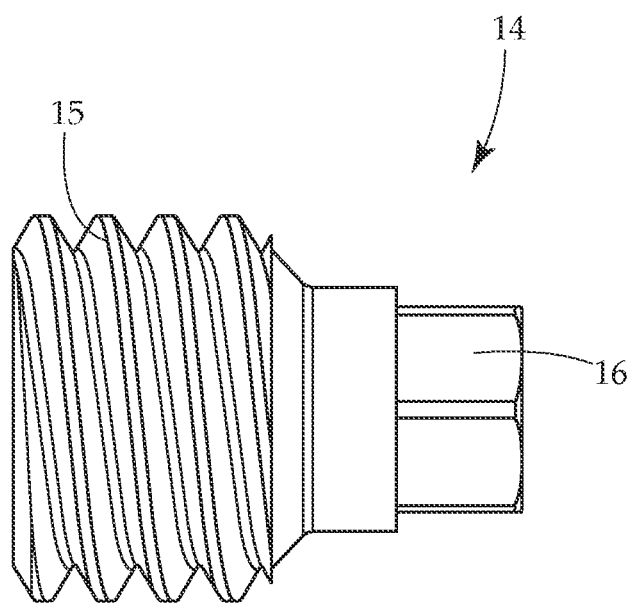
FIG. 4C provides a side view of an embodiment of an abutment of the dental implant system disclosed herein.

FIGS. 4A-4C show views of an embodiment of the abutment 14. In the cross sectional view, the opening 44 for the screw to pass through can be seen extending all the way from front to rear of the abutment. The head of the screw 32 has a larger cross section than the opening 44, causing the screw head 32 to engage with the shoulder formed by the change between opening 44 and the larger opening 43. Opening 43 is sized to receive the screw head 32. An inside head area 42 of the abutment 14 defines the threads 15 on the outside. On the inside is a hexagonal opening 41 for engagement with a bit such as a screw driver. Of course other cross-sectional shapes may be used without straying from this invention. The hexagonal opening 41 is at a rear of the abutment and directly next to the larger opening 41 into which a head of the prosthetic screw can set. Immediately after the larger opening 43 is the screw thread opening 44, which allows passage of the screw thread.

Figure 5A:
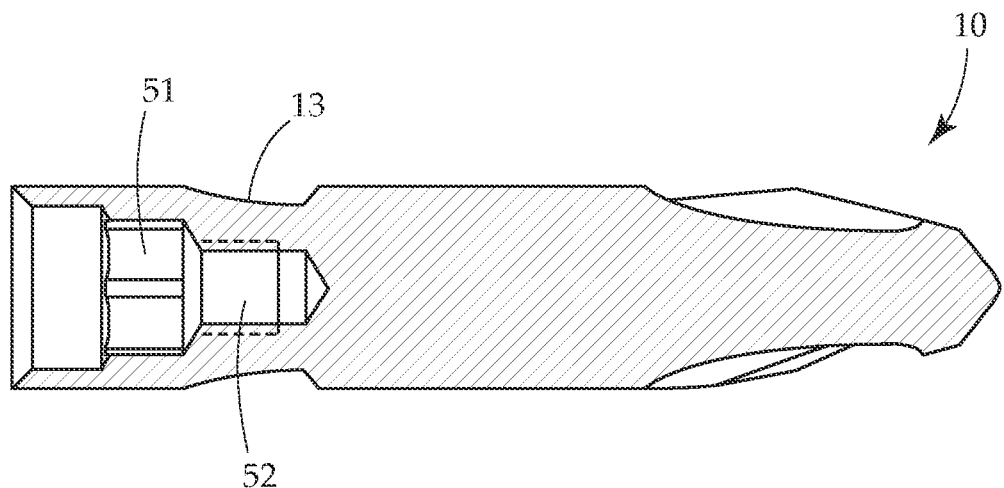
FIG. 5A provides a side cutaway view of an embodiment of an implant of the dental implant system disclosed herein.
Figure 5B:
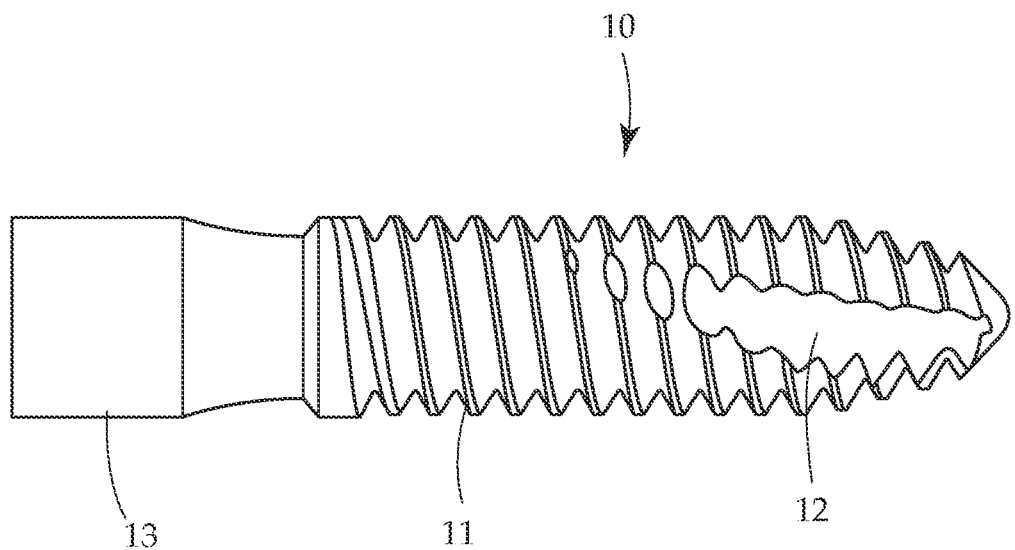
FIG. 5B provides a side cutaway view of an embodiment of an implant of the dental implant system disclosed herein.

FIGS. 5A and 5B show views of an embodiment of the implant 13. In this embodiment implant has a self-driving bit portion 12 which allows it to operate similarly to a drill bit as well as a screw to drill its own hole. These embodiments are referred to herein as "self-drilling" implants. Of course in other embodiments, the implant may be a traditional implant or self-tapping implants. Threads 11 of the implant on area 10 allow for the implant to effectively secure to the bone of a patient. As seen in the cross-sectional view of FIG. 5A, a top part of the implant defines a central opening part way into its length. The opening includes a receiving area 51 for the abutment's front 16. Receiving area 51, in most embodiments, has a cross-sectional shape corresponding to the front 16 of the abutment so that the two can engage. A threaded area 52 is immediately after the receiving area 51 and extends further into the implant 13. The threaded area 52 and receiving area 51 are a continuous opening, with varying cross sectional shapes and sizes. This threaded area is sized to receive the prosthetic screw 17 which holds the abutment 14 to the implant 13.

Figure 6:
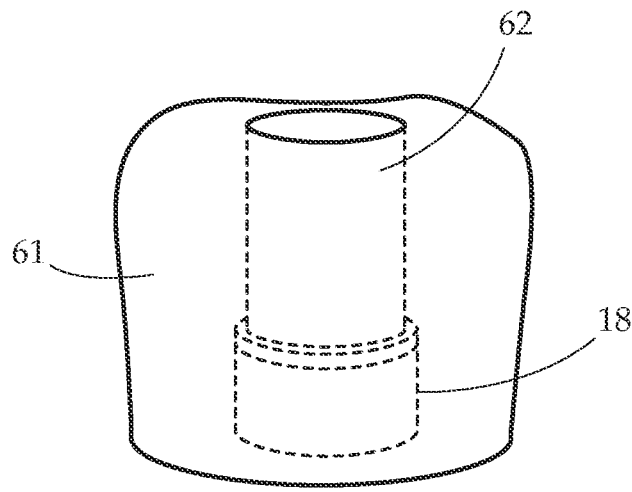
FIG. 6 provides a view of an embodiment of a crown which can be mounted on a base of the dental implant system.

FIG. 6 shows an embodiment of a crown which is attached to the ti-base 18. The crown 61 is shaped as a replacement tooth for the patient. An opening 62, or passageway, through the crown 61 and is open at top and bottom. The ti-base 18 is anchored to the crown 61. The opening 62 is sized to allow passage of the implant and also the abutment. In many embodiments, the cross-sectional diameter of the opening 62 is just slightly larger than a cross-sectional diameter of the implant 13, so that the opening 62 can act as a guide to ensure proper placement of the implant, making sure it goes at a proper angle, and proper depth.

In many embodiments the implant can pass through the opening 62 and the ti-base 18, and then the abutment threads 15 will engage with the threads 20 of the ti-base 18, securing the two together. In many embodiments, the opening is specially oriented and sized to guide the direction of the implant. For example if a slight angle is required for proper placement of the implant, the opening 62 will be at this specific angle, causing the implant to be properly angled as it enters the bone of the patient. This will work whether a hole for the implant is pre-drilled, or if the implant is self-drilling. With the abutment attached, the implant 13 can be driven into the bone of the patient, and as it reaches the proper depth, the screw threads of the abutment 15 engage the ti-base 20. This draws the entire assembly together such that the crown 61 is anchored in position in a mouth of the user at the same time that the implant 13 is placed into the bone. In some embodiments, support such as wings may be adhered to adjacent teeth, and/or a brace or retainer may be used to hold the crown 61 safely in place while the implant 13 sets into the bone and the bone grows around the implant.

Figure 7:
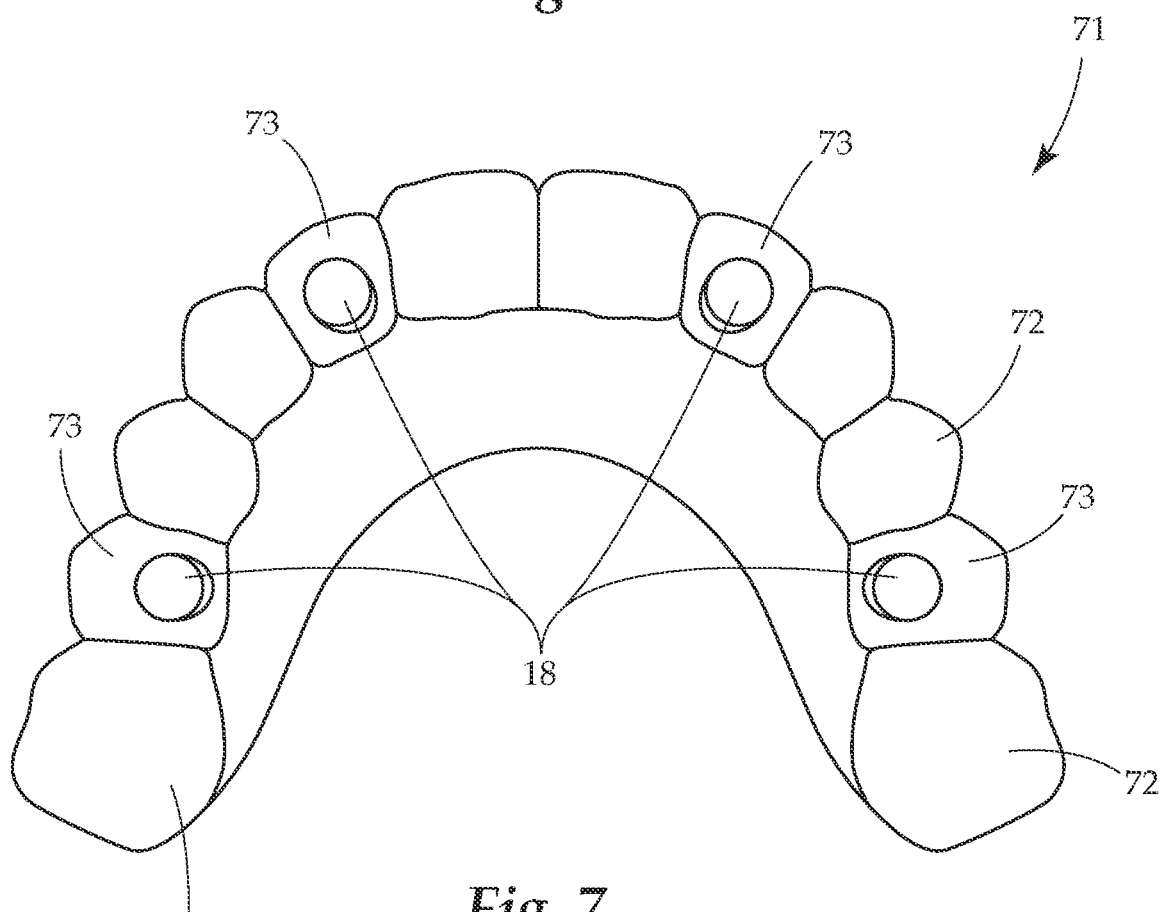
FIG. 7 provides a view of an embodiment of a denture which can be mounted on multiple base of multiple implants of the dental implant system.

FIG. 7 provides a view of a full denture 71 which can be attached to 4 of the multi-piece implants. The ti-base 18 is seen bonded to the denture 72 and aligned with openings 73. These openings 73 are sized to allow passage of implants, in the same way as the opening 62 of crown 61 as discussed above.

Figure 8:
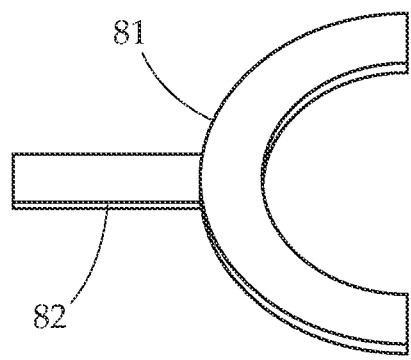
FIG. 8 provides a view of a spacer key used for placement of the implant.
Figure 9:
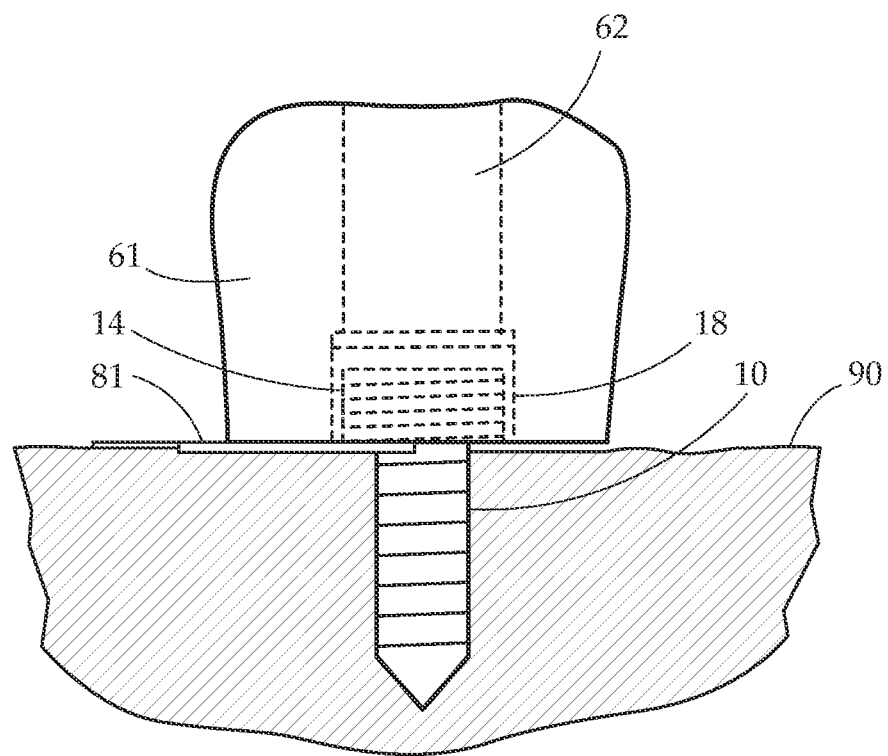
FIG. 9 provides a view of a placement of the implant using the spacer key.

FIGS. 8 and 9 show a spacer key and an installation of a crown using the spacer key. The spacer key 18 is formed as a "U" or "C" shape which can fit under the crown 61 between the crown 61 and gums 90 of the patient. The crown 61 is installed by passing the implant 10 and abutment 14 through the opening 62. The threads of implant 10 engage with the bone of the patient as it is drilled into place. At the same time, outer threads of the abutment 14 engage with inner threads of the ti-base 18 as discussed above. The ti-base having the crown 61 (or other prosthetic) attached thereto. The spacer 81 is positioned between gum 90 and crown 61 by handle 82. The spacer 81 operates to prevent the implant from being drilled in too deeply, causing the crown 61 to be forcefully drawn into the patient's gum and bone by the threaded pulling of the implant 10. An open side of the spacer 81 is important because it allows the spacer to be removed after implant placement. While not shown, the proper alignment of the crown 61 for placement of the implant, as guided by opening 62, is achieved by using a surgical guide. The surgical guide is similar to a fitted mouthpiece or invisalign mouthpiece which is specifically molded to the patient's teeth. This can then ensure a fixed and proper alignment of the crown, and in turn the opening 62. Proper orientation of the opening 62 in turn guides the implant 10 and abutment 14 as they are being installed into the patient. This surgical guide, in many embodiments, remains in place for some time to allow the implant 10 to fuse with the bone of the patient and to protect the crown 61 from being knocked or force out of place.

In one embodiment, the drill for placing the implant will be stopped once a force of approximately 30-35 Newtons is achieved, to result in a tight but not over-tight and not damaging to the gum tissue. In a similar embodiment, the abutment 14 may be screwed into the implant to a force of 10-15 Newtons.

A particular advantage to the inventions disclosed herein is that it allows the placement of a crown or other prosthetic at the same time that the implant is placed into the bone of the patent. This is very advantageous because in the prior art, patients must wait months for the bone and implant to fuse before the crown can be placed, causing discomfort and visibly missing teeth. Even further, the system allows a regular dentist, rather than an oral surgeon or periodontist, to place these crowns/dentures/partial dentures. This will drastically reduce the costs to patients because they will not need to go to a specialist. A regular dentist is able to place these crowns using the inventive disclosure because all that is required of the dentist is to place the implant, which is a simple drilling/screwing operation, especially in self-drilling implant embodiments. The guide hole 62 of the crown 61 is prepared based on mouth x-rays or other imaging by an off-site service, as is the proper implant sizing. The opening 62 is formed in the implant 61 at an angle and orientation so that the implant 10 passes through at the desired angle for implanting into the bone. Therefore, implant location, depth, angle, and size need not be determined by a dentist. They are delivered the crown (attached to the ti-base), surgical guide based on the adjacent teeth or a molded spacer, and the implant-abutment assembly. The dentist simply may place the surgical guide in the patients mouth, holding the crown 61 (etc.) in place, and then screw in the implant to the desired tension force. The opening 62 is filled with industry standard filling material, completing the crown. The patient leaves with a protective guard in place to protect the crown as the implant 10 sets into the bone, which can eventually be removed.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A multi-piece dental prosthesis comprising:
   an implant operable to be implanted into a bone of a patient;
   an abutment removably engaged with the implant;
   wherein a front portion of an exterior surface of the abutment defines a cross-sectional shape, and wherein a central opening of the abutment further defines a second cross sectional shape to receive a bit to axially rotate the abutment;
   wherein the implant defines an opening having a matching cross-sectional shape to the abutment front portion at its top, the abutment cross-sectional shape and matching opening cross-sectional shape engageable together, to prevent axial rotation of the abutment relative to the implant;
   a ti-base defining a central opening, and being engageable with the abutment;
   further comprising a crown attached to the ti-base, wherein the crown defines an opening through its height in communication with the central opening of the ti-base; and
   wherein the central opening of the ti-base has a minimum cross-sectional area greater than a maximum cross sectional area of the implant, such that the implant can fully pass through the ti-base.

2. The multi-piece dental prosthesis of claim 1 wherein the implant comprises threads on a portion of its outer surface.

3. The multi-piece dental prosthesis of claim 1 wherein the abutment is removably engaged with the implant via a prosthetic screw engaged with both the implant and the abutment.

4. The multi-piece dental prosthesis of claim 3 wherein the prosthetic screw removable from the implant by being unscrewed and passing through the central opening of the abutment.

5. The multi-piece dental implant of claim 3 wherein the implant further defines a threaded opening on its interior beyond the opening having the matching cross section, the threaded opening sized to receive the prosthetic screw.

6. The multi-piece dental prosthesis of claim 3 wherein a head of the prosthetic screw engages with a shoulder of the abutment, and wherein a thread of the prosthetic screw engaged with a threaded opening of the implant.

7. The multi-piece dental prosthesis of claim 1 wherein the abutment has threads on an outer portion.

8. The multi-piece dental prosthesis of claim 7 wherein the ti-base comprises threads extending into the central opening, the threads of the abutment outer portion engageable with the threads of the ti-base central opening.

9. The multi-piece dental prosthesis of claim 1 wherein the central opening of the abutment defining a more narrow passage from the second cross sectional shape for a threaded end of the prosthetic screw to pass through and engage directly with interior threads of the implant.

10. The multi-piece dental prosthesis of claim 1 wherein a cross-section of the opening through the crown is larger than a cross section of the implant, so as to guide the implant when passed through the opening.

11. The multi-piece dental prosthesis of claim 1 wherein the crown is a portion of a denture attached to the ti-base.

12. The multi-piece dental prosthesis of claim 1 wherein the crown is a portion of a partial denture attached to the ti-base.

13. The multi-piece dental prosthesis of claim 1 wherein the bit is a head of a screwdriver.

14. The multi-piece dental prosthesis of claim 1 wherein a largest cross sectional area of the abutment is greater than a largest cross sectional area of the implant.

15. The multi-piece dental prosthesis of claim 1 wherein the ti-base comprises a plurality of ridges on an outer surface of the ti-base.

16. The multi-piece dental prosthesis of claim 1 wherein the ti-base further comprises an annular flange at its bottom.

17. The multi piece dental prosthesis of claim 16 wherein the annular flange is configured to abut a gum of a patient when the ti-base is attached to the abutment.

18. A method of removing a multi-piece dental prosthesis, the multi-piece dental prosthesis comprising:
   an implant operable to be implanted into a bone of a patient;
   an abutment removably engaged with the implant;
   wherein a front portion of an exterior surface of the abutment defines a cross-sectional shape, and wherein a central opening of the abutment further defines a second cross sectional shape to receive a bit to axially rotate the abutment;
   wherein the implant defines an opening having a matching cross-sectional shape to the abutment front portion at its top, the abutment cross-sectional shape and matching opening cross-sectional shape engageable together, to prevent axial rotation of the abutment relative to the implant;
   a ti-base defining a central opening, and being engageable with the abutment;
   further comprising a crown attached to the ti-base, wherein the crown defines an opening through its height in communication with the central opening of the ti-base;
   wherein the abutment is removably engaged with the implant via a prosthetic screw engaged with both the implant and the abutment;
   wherein the prosthetic screw is removable from the implant by being unscrewed and passing through a central opening of the abutment;
   the method comprising the steps of:
   unscrewing the prosthetic screw;
   removing the prosthetic screw through the central opening of the ti-base;
   drawing the abutment away from the implant, the ti-base remaining attached to the abutment.

19. The method of claim 16 further comprising the step of drilling a hole through the crown attached to the ti-base, the hole aligning with the central opening of the ti-base.

* * * * *